(12) United States Patent
Shimizu et al.

(10) Patent No.: US 12,725,860 B2
(45) Date of Patent: Sep. 1, 2026

(54) END CAP ASSEMBLY FOR A CYLINDRICAL BATTERY CAN

(71) Applicant: Panasonic Intellectual Property Management Co., Ltd., Osaka (JP)

(72) Inventors: Kazumichi Shimizu, Osaka (JP); Takeshi Nagao, Osaka (JP); Shinya Geshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 735 days.

(21) Appl. No.: 18/041,232

(22) PCT Filed: Sep. 17, 2021

(86) PCT No.: PCT/JP2021/034224

§ 371 (c)(1),
(2) Date: Feb. 10, 2023

(87) PCT Pub. No.: WO2022/070973

PCT Pub. Date: Apr. 7, 2022

(65) Prior Publication Data

US 2023/0307749 A1 Sep. 28, 2023

(30) Foreign Application Priority Data

Sep. 30, 2020 (JP) ................................ 2020-165056

(51) Int. Cl.
*H01M 50/184* (2021.01)
*H01M 10/0587* (2010.01)
(Continued)

(52) U.S. Cl.
CPC ....... *H01M 50/184* (2021.01); *H01M 50/152* (2021.01); *H01M 50/169* (2021.01);
(Continued)

(58) Field of Classification Search
CPC ............. H01M 50/184; H01M 50/152; H01M 50/169; H01M 50/19; H01M 10/613; H01M 10/0587; Y02E 60/10
See application file for complete search history.

(56) References Cited

U.S. PATENT DOCUMENTS

2014/0011077 A1* 1/2014 Li ........................ H01M 50/152 429/175
2014/0059847 A1* 3/2014 Nakamura ........ H01M 10/0481 29/623.2

(Continued)

FOREIGN PATENT DOCUMENTS

JP 2014-049396 A 3/2014
JP 2019-519078 7/2019

(Continued)

OTHER PUBLICATIONS

International Search Report of PCT application No. PCT/JP2021/034224 dated Nov. 22, 2021.

(Continued)

*Primary Examiner* — Maria Laios
*Assistant Examiner* — Lawrence La Raia, III
(74) *Attorney, Agent, or Firm* — RIMON P.C.

(57) ABSTRACT

An electricity storage device to be disclosed includes: an electrode assembly including a first electrode and a second electrode; a can accommodating the electrode assembly and including a bottomed tubular shape with an opening provided at one end; and a sealing material joined to the one end of the can to seal the opening. The sealing material includes a first ring that is conductive, a second ring that is conductive and joined to the first ring, a terminal plate that is conductive provided between the first ring and the second ring, and an insulation ring insulating the first ring and the second ring from the terminal plate. An outer peripheral edge of the (Continued)

terminal plate is held between the first ring and the second ring with the insulation ring being put therebetween.

14 Claims, 10 Drawing Sheets

(51) Int. Cl.

| | |
|---|---|
| ***H01M 10/613*** | (2014.01) |
| ***H01M 50/152*** | (2021.01) |
| ***H01M 50/169*** | (2021.01) |
| ***H01M 50/19*** | (2021.01) |

(52) U.S. Cl.
CPC ........ *H01M 50/19* (2021.01); *H01M 10/0587* (2013.01); *H01M 10/613* (2015.04); *Y02E 60/10* (2013.01)

(56) References Cited

U.S. PATENT DOCUMENTS

| | | | |
|---|---|---|---|
| 2019/0267583 | A1 | 8/2019 | Masumoto et al. |
| 2022/0102789 | A1 | 3/2022 | Shimizu et al. |
| 2022/0123395 | A1 | 4/2022 | Kohira et al. |

FOREIGN PATENT DOCUMENTS

| | | | |
|---|---|---|---|
| WO | 2017/223429 | | 12/2017 |
| WO | 2020/111275 | A1 | 6/2020 |
| WO | 2020/138492 | A1 | 7/2020 |

OTHER PUBLICATIONS

The EPC Office Action dated Jul. 4, 2024 for the related European Patent Application No. 21875275.6.

* cited by examiner

D1
D2
D3
D
10
20
21
22
30
31
32
33
34
35
40
50

31
31a
34
33
FIG. 6A
31b
31 31a 32 32a
34
33
FIG. 6B
31b
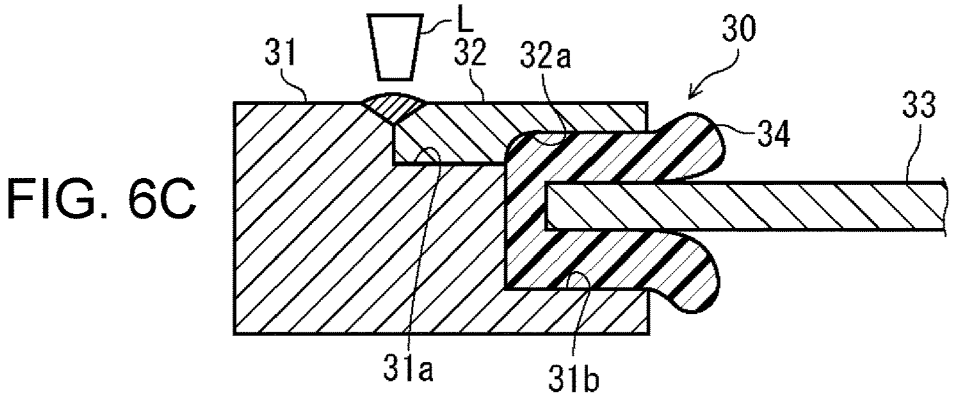
FIG. 6C
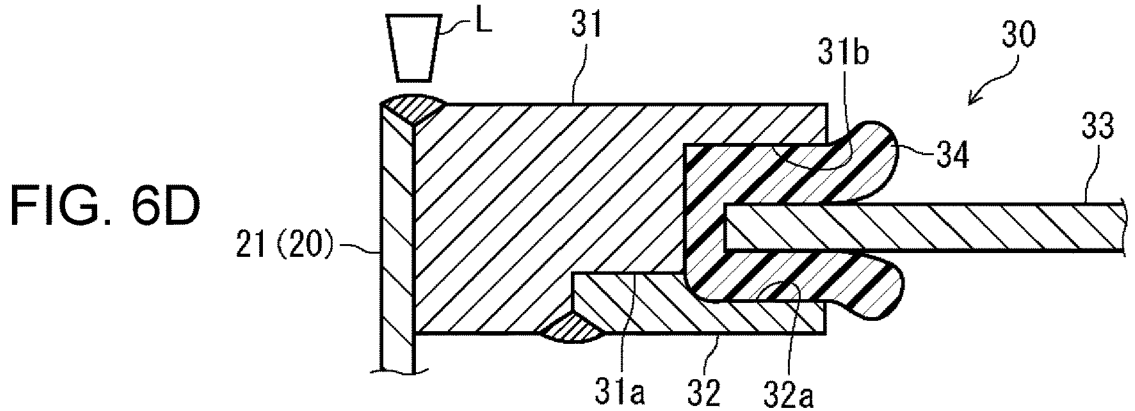
FIG. 6D

END CAP ASSEMBLY FOR A CYLINDRICAL BATTERY CAN

CROSS-REFERENCE TO RELATED APPLICATIONS

This application is a U.S. national stage application of the PCT International Application No. PCT/JP2021/034224 filed on Sep. 17, 2021, which claims the benefit of foreign priority of Japanese patent application No. 2020-165056 filed on Sep. 30, 2020, the contents all of which are incorporated herein by reference.

The present disclosure relates to an electricity storage device and a method for producing the electricity storage device.

BACKGROUND ART

Conventionally, as an example of an electricity storage device, a battery including a battery can having a bottomed tubular shape and having an opening provided at one end and a battery cap sealing the opening is known (for example, PTL 1). As illustrated in FIG. 4 of PTL 1, the battery cap of the battery of PTL 1 includes an outer conductive ring, a conductive top plate and a conductive rupture plate electrically insulated from the outer conductive ring, and two insulators for the electrical insulation. The outer conductive ring functions as a cathode, while the conductive top plate and the conductive rupture plate function as a positive electrode.

CITATION LIST

Patent Literature

PTL 1: Unexamined Japanese Patent Publication No. 2019-519078

SUMMARY OF THE INVENTION

Technical Problem

However, the battery cap of the battery of PTL 1 has a large number of components and the shape of each component is complicated, and therefore the production cost may be increased. In such a situation, one of the objects of the present disclosure is to provide an electricity storage device that is low in production cost and is configured to be easily connected with an external lead wire.

One aspect according to the present disclosure relates to an electricity storage device. The electricity storage device includes: an electrode assembly including a first electrode and a second electrode; a can accommodating the electrode assembly and including a bottomed tubular shape with an opening provided at one end; and a sealing material joined to the one end of the can to seal the opening, in which the sealing material includes a first ring that is conductive, a second ring that is conductive and joined to the first ring, a terminal plate that is conductive provided between the first ring and the second ring, and an insulation ring insulating the first ring and the second ring from the terminal plate, and the terminal plate includes an outer peripheral edge held between the first ring and the second ring with the insulation ring being put between the outer peripheral edge and the first ring and the second ring.

Another aspect of the present disclosure relates to a method for producing the electricity storage device. The method for producing the electricity storage device, the method includes: a first step of placing the insulation ring and the terminal plate on one of the first ring and the second ring; a second step of pressing the insulation ring on the other of the first ring and the second ring to hold the outer peripheral edge of the terminal plate with the insulation ring and compress the insulation ring; a third step of obtaining the sealing material by joining the first ring and the second ring to each other with the insulation ring being compressed; and a fourth step of joining the first ring to the one end of the can.

According to the present disclosure, an electricity storage device is obtained, the electricity storage device configured to suppress the configuration of a sealing material from becoming complicated, to be low in production cost, and to be easily connected with an external lead wire.

BRIEF DESCRIPTION OF THE DRAWINGS

FIG. 6A is a view for describing a first step of a method for producing the battery of the second exemplary embodiment.

FIG. 6B is a view for describing a second step of the method for producing the battery of the second exemplary embodiment.

FIG. 6C is a view for describing a third step of the method for producing the battery of the second exemplary embodiment.

FIG. 6D is a view for describing a fourth step of the method for producing the battery of the second exemplary embodiment.

DESCRIPTION OF EMBODIMENT

Figure 1:
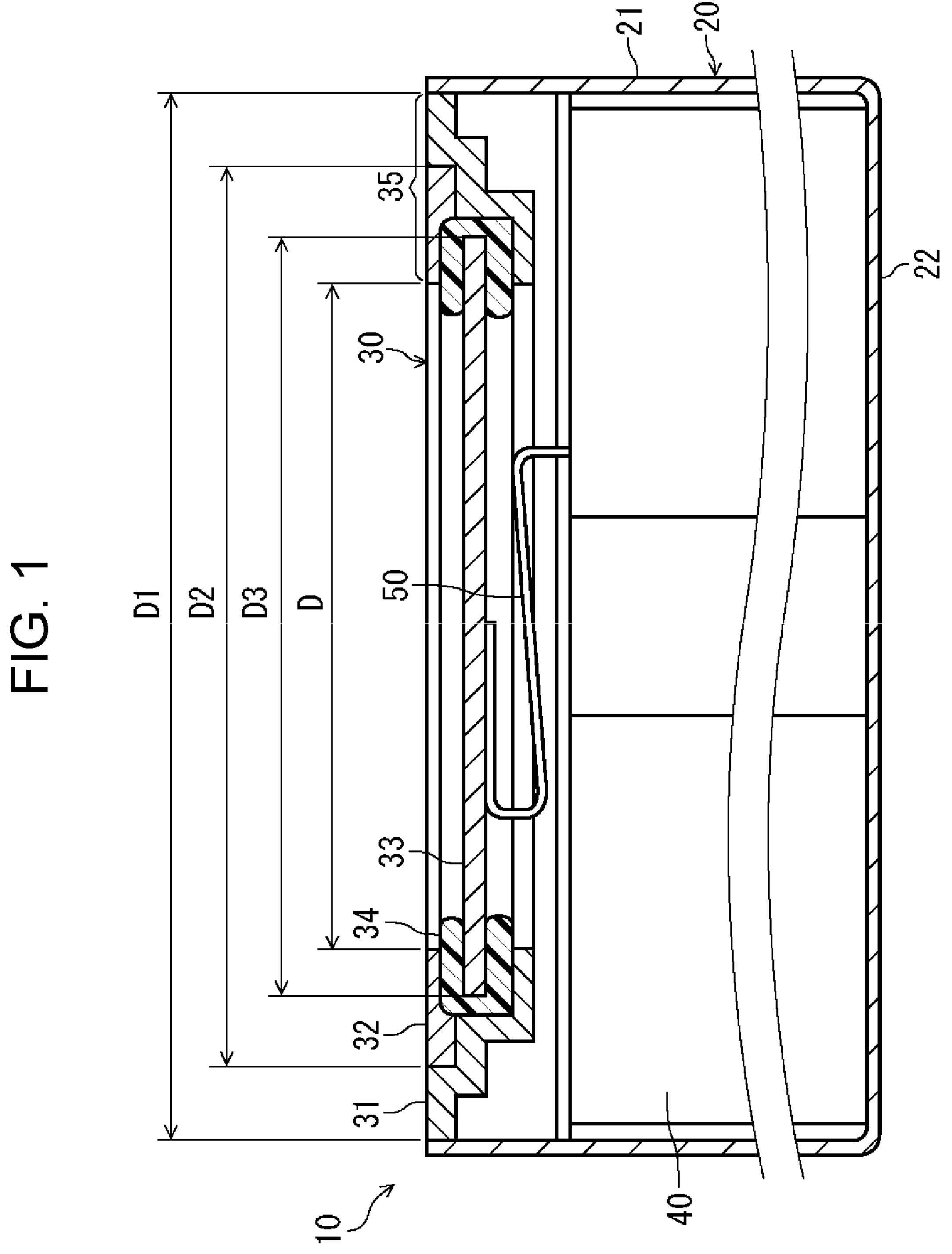
FIG. 1 is a longitudinal sectional view schematically illustrating a battery of a first exemplary embodiment.

Exemplary embodiments of an electricity storage device of the present disclosure will be described below with reference to examples of a battery. However, the electricity storage device of the present disclosure is not limited to the example described below. In the following description, specific numerical values and materials may be exemplified, but other numerical values and materials may be applied as long as the effects of the present disclosure can be obtained. The electricity storage device of the present disclosure may include a capacitor and the like in addition to the battery of the following exemplary embodiments.

(Electricity Storage Device)

The electricity storage device of the present disclosure includes a can and a sealing material. These will be described below.

(Can)

The can has a bottomed tubular shape and has an opening provided at one end. The can may include a tubular part having a cylindrical shape and a bottom. The tubular part may have a rectangular tubular shape in addition to the cylindrical shape. The tubular part may include the opening at one end, and the other end may be closed with the bottom. The material of the can is not particularly limited, and may be, for example, iron, an iron alloy, copper, aluminum, or an aluminum alloy. When the can is electrically connected to a negative electrode of the electrode assembly, the material of the can is preferably iron or copper, and when the can is electrically connected to a positive electrode of the electrode assembly, the material of the can is preferably aluminum or an aluminum alloy.

(Sealing Material)

The sealing material seals the opening at the one end of the can and is joined to the one end. The sealing material includes a first ring that is conductive, a second ring that is conductive, a terminal plate that is conductive, and an insulation ring having insulation. The sealing material further includes an exposed surface exposed to the outside of the battery.

The first ring includes first outer diameter D1. The first ring is joined to one end of the can. The first ring may have an outer peripheral shape of, for example, a circular shape or a rectangular shape. The first ring may have an inner peripheral shape of, for example, a circular shape or a rectangular shape. The material of the first ring is not particularly limited, and configured to be selected from those exemplified as the material of the can. The material of the first ring may be different from the material of the can.

The second ring may have second outer diameter D2 smaller than first outer diameter D1. The second ring is joined to the first ring. The second ring may have an outer peripheral edge joined to the first ring. The second ring may have an outer peripheral shape of, for example, a circular shape or a rectangular shape. The second ring may have an inner peripheral shape of, for example, a circular shape or a rectangular shape. The material of the second ring is not particularly limited, and configured to be selected from those exemplified as the material of the can. The material of the second ring may be different from the material of the can or the material of the first ring. Second outer diameter D2 may be equal to first outer diameter D1, and the second ring may have an outer peripheral edge joined to one end of the can together with the outer peripheral edge of the first ring.

The terminal plate may have third outer diameter D3 smaller than second outer diameter D2. The terminal plate is accommodated in at least one of the first ring and the second ring. The terminal plate has an outer peripheral edge held between the first ring and the second ring with the insulation ring being put therebetween. The terminal plate may have a shape of, for example, a disk shape or a rectangular shape. The material of the terminal plate is not particularly limited, and configured to be selected from those exemplified as the material of the can. When the terminal plate is electrically connected to a negative electrode of the electrode assembly, the material of the terminal plate is preferably iron or copper, and when the terminal plate is electrically connected to a positive electrode of the electrode assembly, the material of the terminal plate is preferably aluminum or an aluminum alloy.

In the terminal plate, a part other than the part held between the first ring and the second ring may extend to the outside of the first ring and the second ring. Furthermore, in the terminal plate, the part extending to the outside of the first ring or the second ring may have an outer diameter larger than first outer diameter D1 or second outer diameter D2 as long as the part excluding the part held by the first ring and the second ring can be electrically insulated from the first ring and the second ring.

The insulation ring electrically insulates the first ring and the second ring from the terminal plate. The sectional shape formed by cutting the insulation ring along the axis may have substantially a U shape or a C shape. The material of the insulation ring is not particularly limited as long as the insulation ring includes electrical insulation, and may be, for example, polypropylene (PP), polyphenylene sulfide (PPS), polyethylene (PE), polybutylene terephthalate (PBT), perfluoroalkoxy alkane (PFA), polytetrafluoroethylene (PTFE), or polyamide (PA).

The exposed surface is formed by the first ring or by the first ring and the second ring. The exposed surface extends radially inward of the can from one end of the can. The exposed surface is a surface exposed to the outside of the electricity storage device. The exposed surface may be an outer surface of the first ring (in other words, the top surface or the top face), or may be outer surfaces of the first ring and the second ring (in other words, the top surface or the top face). The exposed surface may have a substantially ring shape. Inner diameter D of the exposed surface may be smaller than third outer diameter D3 of the terminal plate. The exposed surface may be connected with an external lead wire.

(Method for Producing Electricity Storage Device)

The method for producing the electricity storage device according to the present disclosure includes the first step, the second step, the third step, and the fourth step. These will be described below.

(First Step)

In the first step, the insulation ring and the terminal plate are placed on one of the first ring and the second ring. In the stage of the first step, the sectional shape formed by cutting the insulation ring along axis may have substantially an L shape. One of the first ring and the second ring may have a recess configured to accommodate at least a part of the insulation ring and a part of the terminal plate.

(Second Step)

In the second step, the insulation ring is pressed by the other of the first ring and the second ring to hold the outer peripheral edge of the terminal plate with the insulation ring and compress the insulation ring. The sectional shape of the insulation ring that is pressed may have substantially a U shape or a C shape.

(Third Step)

In the third step, a sealing material is obtained by joining the first ring and the second ring to each other with the insulation ring being compressed. The first ring and the second ring may be joined to each other by laser welding, for example. The first ring and the second ring may be joined to each other over the entire circumference in the circumferential direction of each ring, or may be intermittently joined to each other. The insulation ring may be retained in a compressed state in a predetermined mold, or may be retained in a compressed state in a device that joins the both rings.

(Fourth Step)

In the fourth step, the sealing material is joined to one end of the can. Due to this, the opening at the one end of the can is sealed. The sealing material may be joined to one end of the can by laser welding, for example. The sealing material may be joined to one end of the can over the entire circumference.

As described above, according to the present disclosure, an electricity storage device is obtained, the electricity storage device configured to have simplified shapes of the first ring and the second ring, to be low in production cost, and to be easily connected with an external lead wire. Furthermore, the workability is enhanced also in that the first to third steps are performed separately from other work in the fourth step. Therefore, according to the present disclosure, such an electricity storage device can be easily produced.

The exposed surface may be formed by the first ring. In this case, by flattening the outer surface of the first ring, it is possible to flatten the exposed surface over the entire exposed surface. Therefore, the exposed surface can be easily flattened as compared with a case where the exposed surface includes a plurality of rings.

The exposed surface may be formed by the first ring and the second ring.

The first ring may include a first recess fitted with the second ring. This allows the first ring and the second ring to be easily aligned when the both rings are joined to each other. At this time, the outer peripheral edge of the second ring and the inner peripheral edge of the first recess of the first ring may be joined by welding. This joining method allows the first ring and the second ring to be joined without penetrating therethrough.

The surface of the second ring opposing the first ring may be provided with a second recess accommodating at least a part of the insulation ring. This configuration facilitates alignment between the insulation ring and the second ring. The second recess of the second ring may be provided with a curved surface or an inclined surface at a connection (internal corner) between an inner bottom surface and an inner side surface. This configuration makes it easy to bend a side wall of the insulation ring accommodated in the second recess of the second ring so as to tilt the side wall radially inward.

A side circumferential surface of at least one of the first ring and the second ring may be provided with a recess or a cutout at a position spaced apart along axis of the can from at least one of the joint between the sealing material and the one end of the can and the joint between the first ring and the second ring. Alternatively or in addition, an upper surface or a lower surface of at least one of the first ring and the second ring may be provided with a recess or a cutout at a position spaced apart in the radial direction of the can from at least one of the joint between the sealing material and the one end of the can and the joint between the first ring and the second ring. The recess or the cutout makes it difficult for heat to be transferred to a region radially inside the recess or the cutout in the sealing material, and therefore it is possible to suppress an influence of heat on the insulation ring.

At least one of the first ring and the second ring may have a protrusion protruding toward the insulation ring along the axis of the can. Due to this, the protrusion compresses the insulation ring more strongly, which allows airtightness of the electricity storage device to be enhanced.

The first ring and the second ring may have a protrusion. Due to this, the number of sites that are strongly compressed by the insulation ring increases, which allows airtightness of the electricity storage device to be further enhanced.

The protrusion of the first ring and the protrusion of the second ring may be arranged side by side along the axis (may face each other). This makes it easy to apply, to the insulation ring, a force compressing the insulation ring, and it is hence possible to further enhance airtightness of the electricity storage device.

The fourth step may be executed after the first step, the second step, and the third step. This allows the second step of pressing the insulation ring and the third step of joining the first ring and the second ring to be performed in a state where the can is not present nearby, and hence workability and reliability can be enhanced.

In the third step, the first ring and the second ring may be joined to each other with an exhaust heat member (cooling member) being brought into contact with at least one of the first ring and the second ring. Due to this, at least a part of the heat generated by the joining is absorbed by the exhaust heat member. The thermal influence on the insulation ring is reduced. This allows damage due to heat of the insulation ring to be suppressed. As the exhaust heat member, for example, it is possible to use a metal, a member having a heat capacity larger than that of the first ring or the second ring, or the like.

The exhaust heat member may be brought into contact with at least one of the first ring and the second ring in a region close to the outer periphery relative to the joint between the first ring and the second ring. This makes it possible to further reduce the thermal influence on the insulation ring positioned close to the inner periphery relative to the joint region.

Hereinafter, examples of the electricity storage device and the method for producing the same according to the present disclosure will be specifically described with reference to the drawings. The configuration elements of the electricity storage device and the steps of the method for producing of the examples described below can be applied with the above-described configuration elements and steps. The configuration elements of the electricity storage device and the steps of the method for producing of the examples described below can be changed based on the above description. The matters described below may be applied to the exemplary embodiment described above. Among the configuration elements of the electricity storage device and the steps of the method for producing the electricity storage device of the examples described below, configuration elements that are not essential for the electricity storage device and the method for producing the electricity storage device according to the present disclosure may be omitted.

First Exemplary Embodiment

Hereinafter, the battery according to the present exemplary embodiment will be first described, and then the method for producing the battery according to the present exemplary embodiment will be described. The following description assumes the upper side of each figure as "upper side" and the lower side of each figure as "lower side", but this is for convenience and does not limit the present disclosure. The following description assumes the axial direction of the battery can (in other words, a direction in which the bottom of the battery can and the sealing material face each other) as "axial direction", and the radial direction of the battery can as "radial direction". When the battery can is not cylindrical but rectangular tubular, the radial direction may be interpreted as a direction perpendicular to a central axis of the tubular part.

(Battery)

Figure 2:
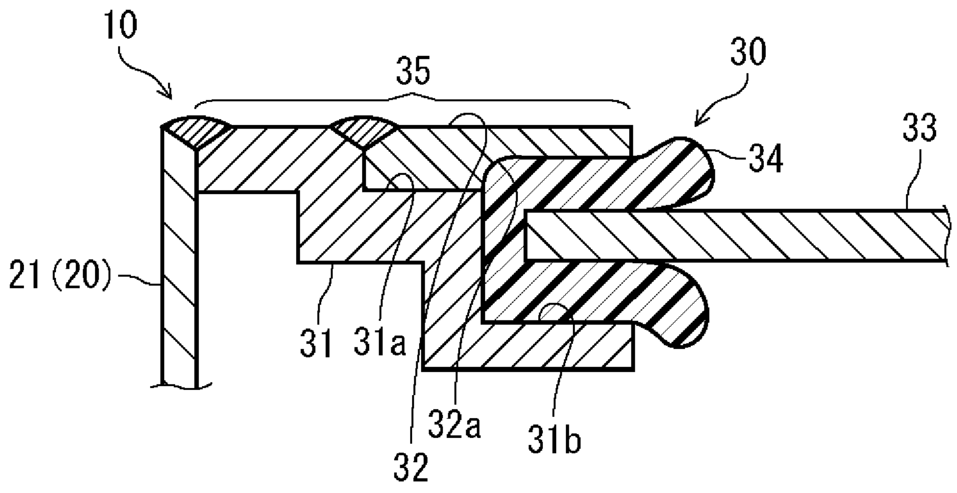
FIG. 2 is an enlarged end face view illustrating a main part of the battery of the first exemplary embodiment.
Figure 3A:
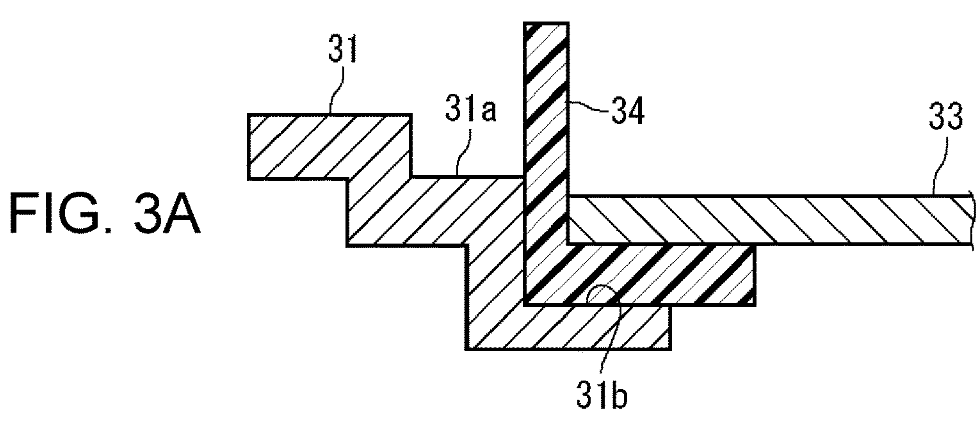
FIG. 3A is a view for describing a first step of a method for producing the battery of the first exemplary embodiment.
Figure 3B:
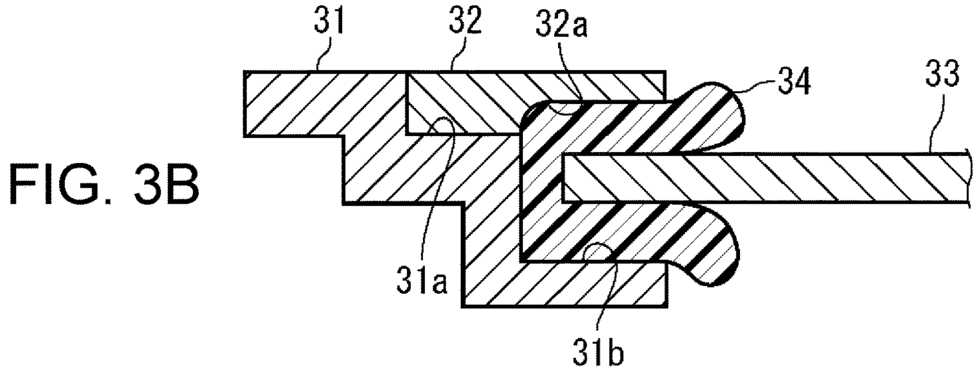
FIG. 3B is a view for describing a second step of the method for producing the battery of the first exemplary embodiment.
Figure 3C:
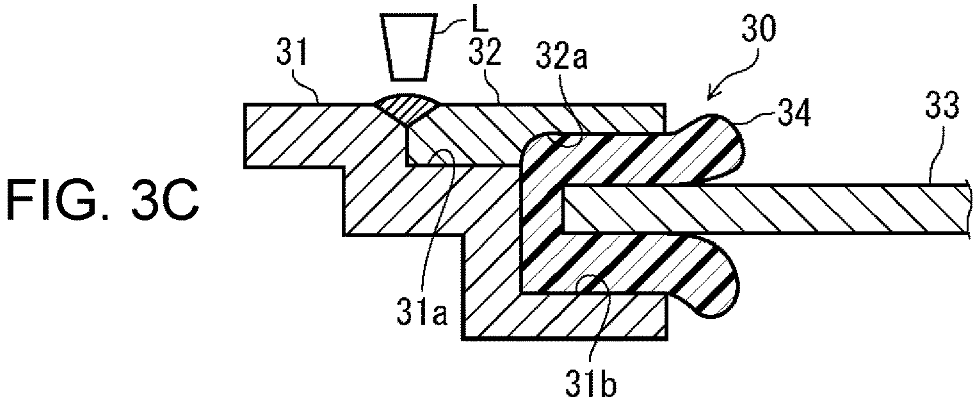
FIG. 3C is a view for describing a third step of the method for producing the battery of the first exemplary embodiment.
Figure 3D:
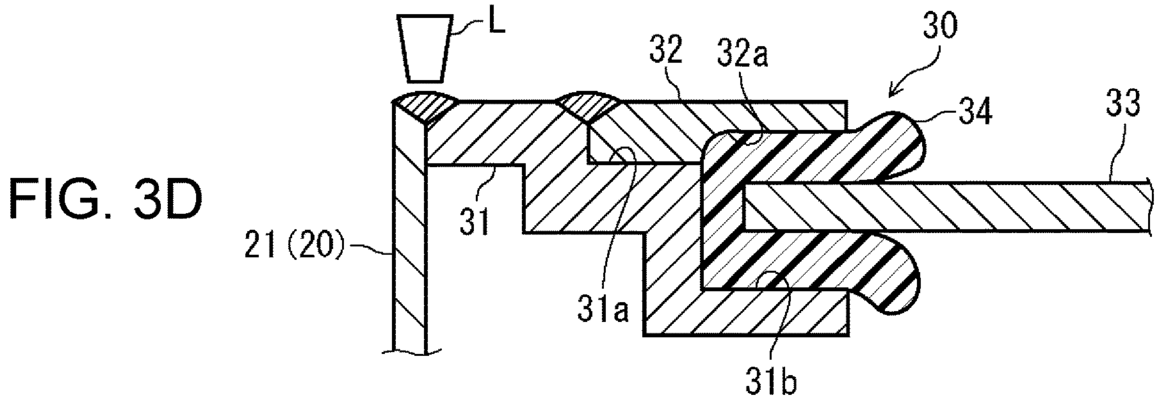
FIG. 3D is a view for describing a fourth step of the method for producing the battery of the first exemplary embodiment.

As illustrated in FIG. 1 and FIG. 2, battery 10, which is an example of the electricity storage device, includes battery can 20, which is an example of the can, electrode assembly 40, and sealing material 30.

Battery can 20 has a bottomed tubular shape and has an opening at one end (upper end). Battery can 20 includes tubular part 21 accommodating electrode assembly 40, and bottom 22 closing a lower end of tubular part 21. Tubular part 21 is formed in a cylindrical shape. Bottom 22 is formed in a disk shape.

Electrode assembly 40 is of a wound type, and is configured by spirally winding a positive electrode (first electrode) and a negative electrode (second electrode) with a separator interposed therebetween. One of the positive electrode and the negative electrode is connected with internal lead wire 50. Internal lead wire 50 is joined by welding or the like to the lower surface of terminal plate 33 described below. The other of the positive electrode and the negative electrode is connected with another lead wire (not illustrated). The other lead wire is joined to an inner surface of battery can 20 by welding or the like. Electrode assembly 40 is accommodated in battery can 20 together with an electrolytic solution (not illustrated). The electrolytic solution may contain a non-aqueous solvent and an electrolytic solution, and may be in a gel state or a solid state.

Sealing material 30 is a structure sealing an opening at the one end of battery can 20. Sealing material 30 includes first ring 31 that is conductive, second ring 32 that is conductive, terminal plate 33 that is conductive, and insulation ring 34 having insulation. Sealing material 30 further includes exposed surface 35 exposed to the outside of battery 10.

First ring 31 has first outer diameter D1. First ring 31 is joined to one end of battery can 20 at an outer peripheral edge of first ring 31 by laser welding, for example. The sectional shape formed by cutting first ring 31 along the axis is a stepwise shape in which the inner diameter and the outer diameter become smaller toward the lower side of battery can 20. This stepwise inner side surface constitutes a part of first recess 31*a* and second recess 31*b* described below. On the lower side along the axis (electrode assembly side), an opening of first ring 31 is positioned radially inside relative to an outer peripheral end of terminal plate 33. Regarding first ring 31, the opening of first ring 31 can be interpreted to include first recess 31*a*, second recess 31*b*, and a through hole provided at the bottom of second recess 31*b*.

First ring 31 include first recess 31*a* recessed downward. First recess 31*a* has an inner diameter substantially the same as or slightly smaller than second outer diameter D2 of second ring 32. The depth of first recess 31*a* is substantially equal to the thickness (vertical length) of second ring 32. First recess 31*a* is fitted with second ring 32. A part of second ring 32 may protrude from first recess 31*a*. Regarding second ring 32, an opening of second ring 32 can be interpreted to include third recess 32*a* (described below) and a through hole provided at the bottom of third recess 32*a*.

First ring 31 includes second recess 31*b* recessed downward on the bottom surface of first recess 31*a*. The inner diameter of the second recess is larger than third outer diameter D3 of terminal plate 33. Second recess 31*b* accommodates at least a part of insulation ring 34 and terminal plate 33.

Second ring 32 has second outer diameter D2 smaller than first outer diameter D1. The outer peripheral edge of second ring 32 and an opening end of first recess 31*a* of first ring 31 (in other words, an upper end opening of the first ring) are joined by laser welding, for example. An inner peripheral end (opening end) of second ring 32 is positioned radially inside relative to the outer peripheral end of terminal plate 33. The radial position of the inner peripheral end (opening end) of second ring 32 may be substantially the same as the radial position of an inner peripheral end of first ring 31. That is, the inner peripheral end of second ring 32 and the inner peripheral end of first ring 31 may be arranged side by side along the axis (may face each other). The inner peripheral end of first ring 31 and the inner peripheral end of second ring 32 may be shifted from each other in the radial direction.

Second ring 32 has third recess 32*a* recessed upward. The inner diameter of third recess 32*a* is substantially equal to the inner diameter of second recess 31*b* of first ring 31. A bottom corner of third recess 32*a* (connection between an inner bottom surface and an inner peripheral surface of third recess 32*a*) is rounded. Third recess 32*a* accommodates a part of insulation ring 34. The inner diameter of second recess 31*b* and the inner diameter of third recess 32*a* may be different from each other.

Terminal plate 33 has third outer diameter D3 smaller than second outer diameter D2. Terminal plate 33 is formed substantially in a disk shape. The outer peripheral edge of terminal plate 33 is held between the inner peripheral edge of first ring 31 and the inner peripheral edge of second ring 32 with insulation ring 34 being put therebetween. It is possible to connect an external lead wire (not illustrated) to an upper surface of terminal plate 33.

Insulation ring 34 electrically insulates first ring 31 and second ring 32 from terminal plate 33. The sectional shape of insulation ring 34 has substantially a U shape or a C shape. Insulation ring 34 may extend to cover the opening upper end of second ring 32, or may extend to cover the opening lower end of first ring 31. This configuration makes it possible to enhance reliability of electrical insulation between first ring 31 and second ring 32 from terminal plate 33.

Exposed surface 35 is formed by first ring 31 and second ring 32. More specifically, a part of exposed surface 35 is formed by an upper surface of first ring 31 close to the outer periphery relative to first recess 31*a*. The rest of exposed surface 35 is formed by an upper surface of second ring 32.

Exposed surface 35 extends radially inward from one end of battery can 20. An inner peripheral end of exposed surface 35 is positioned radially inside relative to the outer peripheral end of terminal plate 33. In top view, exposed surface 35 may cover more than or equal to half of insulation ring 34 or less than or equal to half of insulation ring 34. Exposed surface 35 can be joined with another external lead wire (not illustrated).

In battery 10 configured as described above, first ring 31 and second ring 32 function as one terminal of the positive electrode and the negative electrode, and terminal plate 33 functions as the other terminal of the positive electrode and the negative electrode. Therefore, it is possible to collect power on the positive electrode and the negative electrode from one side (upper side) of battery 10.

(Method for Producing Battery)

As illustrated in FIGS. 3A to 3D, the method for producing the battery includes the first step, the second step, the third step, and the fourth step. In the present exemplary embodiment, the first step, the second step, the third step, and the fourth step are executed in this order. However, the execution order of each step is not limited to this.

In the first step, insulation ring 34 and terminal plate 33 are placed on first ring 31. At this time, second recess 31*b* of first ring 31 accommodates at least a part of insulation ring 34 and terminal plate 33.

In the second step, insulation ring 34 is pressed by second ring 32, the outer peripheral edge of terminal plate 33 is held by insulation ring 34, and insulation ring 34 is compressed. At this time, since the bottom corner of third recess 32*a* of second ring 32 is rounded, insulation ring 34 can be guided by the rounded part and bent so as to tilt second ring 32 radially inward.

In the third step, with insulation ring 34 compressed, first ring 31 and second ring 32 are joined to each other to obtain sealing material 30. At this time, it is preferable to join first ring 31 and second ring 32 over the entire circumference in the circumferential direction of first ring 31 and second ring 32 by laser welding using laser L. First ring 31 and second ring 32 may be joined to each other in a region close to the outer periphery relative to the joint between first ring 31 and second ring 32 with an exhaust heat member (cooling member) being brought into contact with first ring 31.

In the fourth step, first ring 31 of sealing material 30 is joined to the one end of battery can 20 accommodating electrode assembly 40. At this time, it is preferable to join first ring 31 to one end of battery can 20 over the entire circumference by laser welding using laser L. Between the third step and the fourth step, a step of connecting one end of an internal lead wire connected to the positive electrode of electrode assembly 40 to the positive electrode, a step of connecting one end of an internal lead wire connected to the negative electrode of electrode assembly 40 to the negative electrode, a step of joining the other end of one of the two internal lead wires to an inner surface of the bottom of battery can 20, a step of joining the other end of the other of the two internal lead wires to a lower surface of terminal plate 33, and a step of accommodating an electrolytic solution into battery can 20 together with electrode assembly 40 may be executed.

Modified Example of First Exemplary Embodiment

A modified example of the first exemplary embodiment will be described. The present modified example is different from the first exemplary embodiment described above in that first ring 31 and second ring 32 have protrusions 31*c* and 32*b*. Hereinafter, differences from the first exemplary embodiment will be mainly described.

Figure 4:
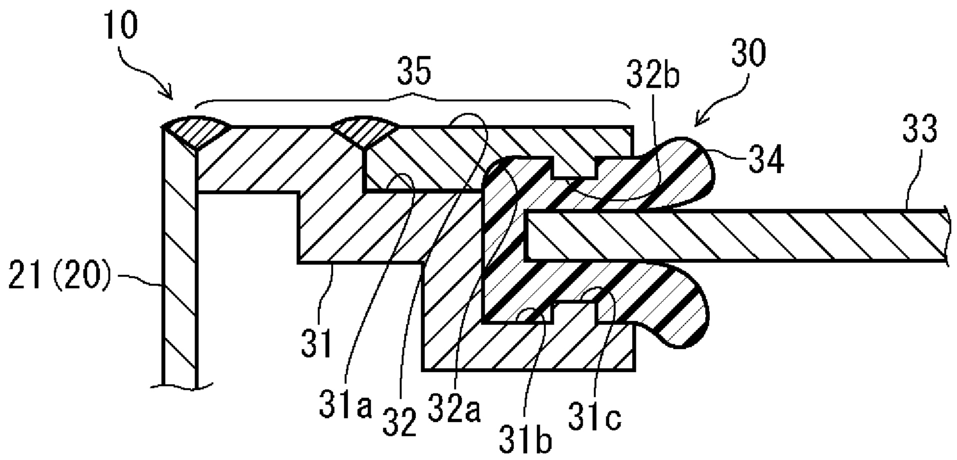
FIG. 4 is an enlarged end face view illustrating a main part of a battery of a modified example of the first exemplary embodiment.

As illustrated in FIG. 4, first ring 31 includes protrusion 31*c* protruding toward insulation ring 34 along the axis. Protrusion 31*c* is provided on a surface of first ring 31 opposing insulation ring 34. Protrusion 31*c* preferably extends annularly on a surface opposing insulation ring 34.

Second ring 32 includes protrusion 32*b* protruding toward insulation ring 34 along the axis. Protrusion 32*b* is provided on a surface of second ring 32 opposing insulation ring 34. Protrusion 32*b* preferably extends annularly on a surface opposing insulation ring 34.

Protrusion 31*c* of first ring 31 and the protrusion 32*b* of second ring 32 are arranged side by side along the axis of battery can 20. In other words, the radial position of protrusion 31*c* of first ring 31 may be substantially the same as the radial position of protrusion 32*b* of second ring 32. This configuration allows protrusion 31*c* and protrusion 32*b* to more strongly compress insulation ring 34.

Second Exemplary Embodiment

The second exemplary embodiment will be described. The present exemplary embodiment is different from the first exemplary embodiment described above in that exposed surface 35 is formed only by first ring 31. Hereinafter, differences from the first exemplary embodiment will be mainly described.

(Battery)

Figure 5:
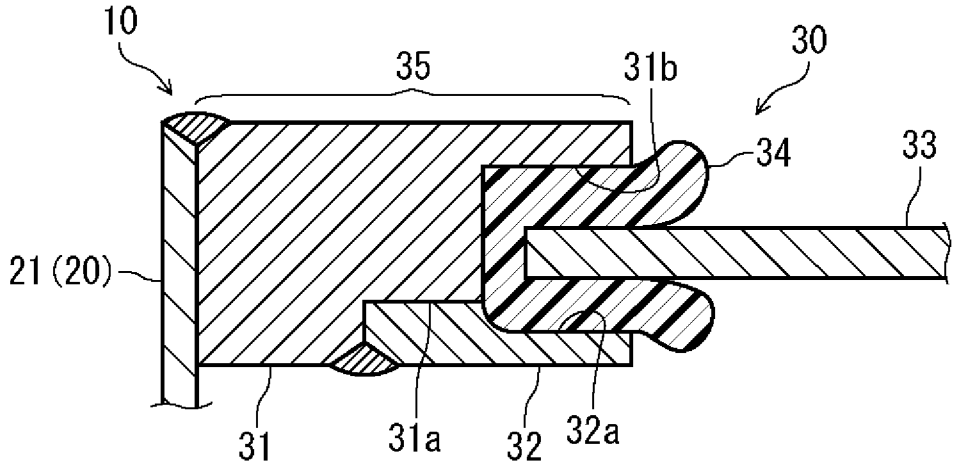
FIG. 5 is an enlarged end face view illustrating a main part of a battery of a second exemplary embodiment.

As illustrated in FIG. 5, first ring 31 of the present exemplary embodiment has a shape filling a space between first ring 31 and battery can 20 in the first exemplary embodiment described above. First ring 31 has an outer peripheral surface that is not stepwise and has a length along axis equal to the length along axis of sealing material 30. First ring 31 is solid from the outer peripheral surface to the inner peripheral surface. A lower surface (surface on electrode assembly 40 side) of first ring 31 is provided with first recess 31*a*, and the bottom surface of first recess 31*a* is provided with second recess 31*b*. The upper surface (surface opposing first ring 31) of second ring 32 is provided with third recess 32*a*. First ring 31 covers at least a part of insulation ring 34 from above. Terminal plate 33 and insulation ring 34 are disposed in a gap between second recess 31*b* and third recess 32*a*. Similarly to the first exemplary embodiment, the outer peripheral edge of terminal plate 33 is held between second recess 31*b* and third recess 32*a* with insulation ring 34 being put therebetween.

First ring 31 and second ring 32 are joined to each other on a lower surface side (electrode assembly 40 side) of sealing material 30. Exposed surface 35 is formed only by first ring 31. Specifically, exposed surface 35 is configured by the upper surface of first ring 31.

(Method for Producing Battery)

As illustrated in FIGS. 6A to 6D, the method for producing the battery includes the first step, the second step, the third step, and the fourth step.

The first step to the third step of the present exemplary embodiment are substantially the same as the first step to the third step of the first exemplary embodiment. Here, in the present exemplary embodiment, since the volume of first ring 31 is larger than that in the first exemplary embodiment described above, there is an advantage that the thermal influence in the joining in the third step hardly reaches insulation ring 34.

In the fourth step, sealing material 30 obtained in the third step is inverted upside down, and then first ring 31 is joined to one end of battery can 20. Since the joint in the third step is positioned inside of battery 10, exposed surface 35 can be easily flattened by flattening the upper surface of first ring 31.

Modified Example 1 of Second Exemplary Embodiment

Modified example 1 of the second exemplary embodiment will be described. The present modified example is different from the second exemplary embodiment described above in the radial length of second ring 32. Hereinafter, differences from the second exemplary embodiment will be mainly described.

Figure 7:
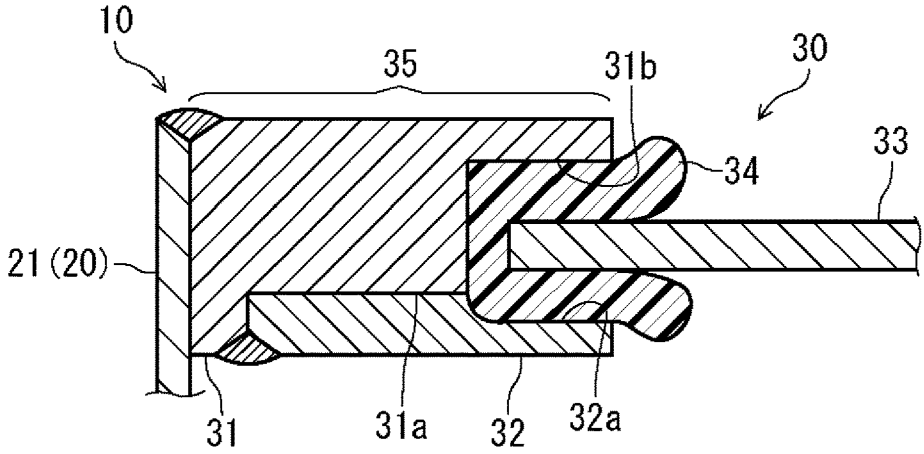
FIG. 7 is an enlarged end face view illustrating a main part of a battery of modified example 1 of the second exemplary embodiment.

As illustrated in FIG. 7, second ring 32 of the present modified example has a radial length longer than that of the second exemplary embodiment. In other words, the inner diameter of first recess 31*a* of first ring 31 of the present modified example is larger than that of the second exemplary embodiment. This configuration makes the position of the joint between first ring 31 and second ring 32 distant from insulation ring 34, and hence insulation ring 34 becomes less likely to be affected by heat from the joint. Therefore, the reliability of battery 10 is enhanced.

Modified Example 2 of Second Exemplary Embodiment

Modified example 2 of the second exemplary embodiment will be described. The present modified example is different from the second exemplary embodiment described above in the length along axis of second ring 32. Hereinafter, differences from the second exemplary embodiment will be mainly described.

Figure 8:
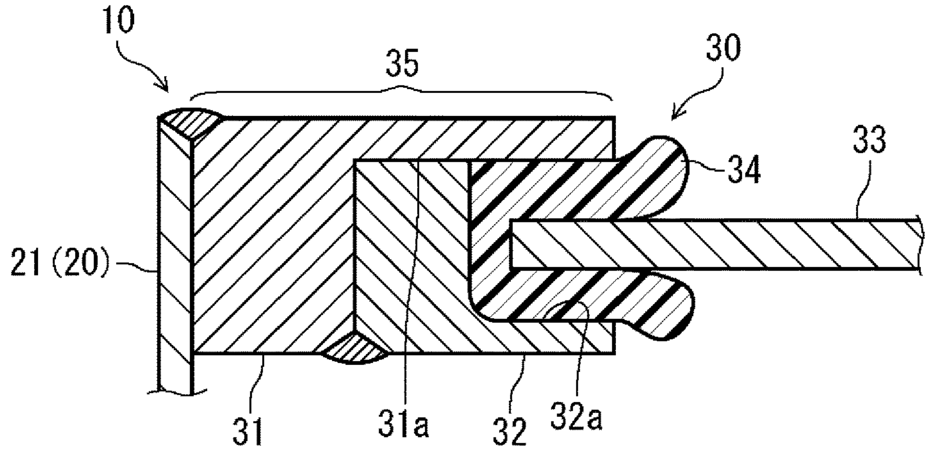
FIG. 8 is an enlarged end face view illustrating a main part of a battery of modified example 2 of the second exemplary embodiment.

As illustrated in FIG. 8, the length along axis of the part of second ring 32 of the present modified example close to the outer periphery relative to insulation ring 34 is longer than that of the second exemplary embodiment described above. First ring 31 includes first recess 31*a* fitted with second ring 32, but does not include second recess 31*b* accommodating at least a part of insulation ring 34 and terminal plate 33. This configuration increases the volume of second ring 32 compared with that of second ring 32 of the second exemplary embodiment, and increases the heat capacity of second ring 32. Therefore, it is possible to suppress the influence of heat on insulation ring 34 from the joint between first ring 31 and second ring 32, as compared with second ring 32 of the second exemplary embodiment.

Modified Example 3 of Second Exemplary Embodiment

Modified example 3 of the second exemplary embodiment will be described. The present modified example is different from the second exemplary embodiment described above in the dimension of second ring 32. Hereinafter, differences from the second exemplary embodiment will be mainly described.

Figure 9:
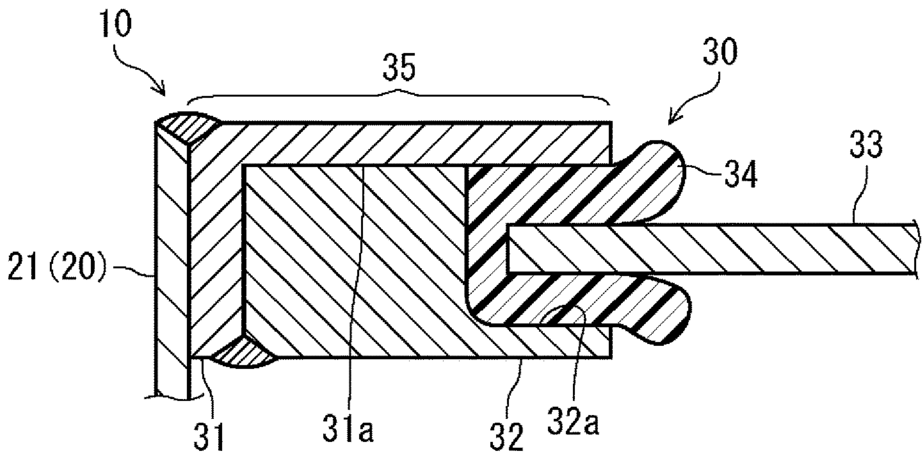
FIG. 9 is an enlarged end face view illustrating a main part of a battery of modified example 3 of the second exemplary embodiment.

As illustrated in FIG. 9, second ring 32 of the present modified example has a radial length longer than that of the second exemplary embodiment. Second ring 32 of the present modified example has a length along axis longer than that of the second exemplary embodiment. Then, first ring 31 includes first recess 31*a* fitted with second ring 32, but does not include second recess 31*b* accommodating at least a part of insulation ring 34 and terminal plate 33. Second ring 32 of the present modified example has a larger volume than second ring 32 of modified examples 1 and 2 of the second exemplary embodiment. Therefore, it is possible to suppress the influence of heat on insulation ring 34 from the joint between first ring 31 and second ring 32, as compared with second ring 32 of modified examples 1 and 2 of the second exemplary embodiment.

Modified Example 4 of Second Exemplary Embodiment

Modified example 4 of the second exemplary embodiment will be described. The present modified example is different from the second exemplary embodiment described above in the shape of first ring 31. Hereinafter, differences from the second exemplary embodiment will be mainly described.

Figure 10:
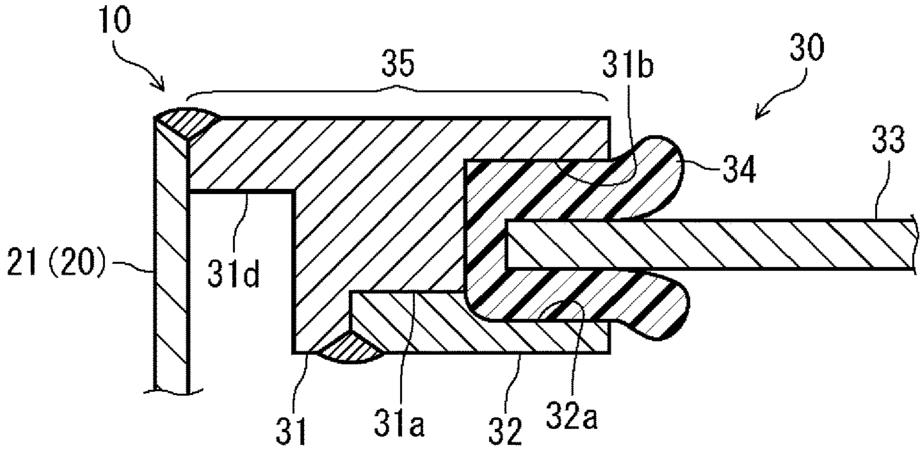
FIG. 10 is an enlarged end face view illustrating a main part of a battery of modified example 4 of the second exemplary embodiment.

As illustrated in FIG. 10, first ring 31 of the present modified example has a shape with first ring 31 of the second exemplary embodiment described above removed (cut out) at a part close to the lower outer periphery. In other words, first ring 31 of the present modified example has fourth recess 31*d* (cutout) in a region close to the lower outer periphery (region close to outer periphery of first ring 31 and inside of battery can 20, the region axially separated from joint between sealing material 30 and battery can 20). This makes sealing material 30 of the present modified example lighter in weight than sealing material 30 of the second exemplary embodiment described above. Fourth recess 31*d* reduces the sectional area of the path of heat transferred from the joint between sealing material 30 and battery can 20 to the radial inside of sealing material 30. Therefore, in sealing material 30, heat is less likely to be transferred to the region radially inside relative to fourth recess 31*d*.

Modified Example 5 of Second Exemplary Embodiment

Modified example 5 of the second exemplary embodiment will be described. The present modified example is different from modified example 1 of the second exemplary embodiment described above in the shape of first ring 31. Hereinafter, differences from modified example 1 of the second exemplary embodiment will be mainly described.

Figure 11:
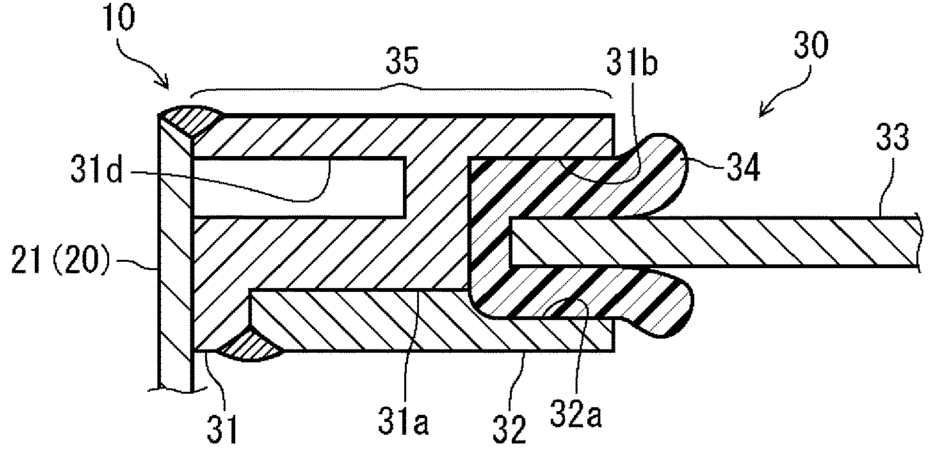
FIG. 11 is an enlarged end face view illustrating a main part of a battery of modified example 5 of the second exemplary embodiment.

As illustrated in FIG. 11, first ring 31 of the present modified example has a shape with first ring 31 of modified example 1 of the second exemplary embodiment described above removed at an intermediate part close to the outer periphery. In other words, fourth recess 31*d* is provided in an intermediate region (region between both axial ends, the region being axially separated from the joint between sealing material 30 and battery can 20 on the outer peripheral surface) along the axis on the outer peripheral surface of first ring 31 of the present modified example. This makes sealing material 30 of the present modified example lighter in weight than sealing material 30 of modified example 1 of the second exemplary embodiment described above. Fourth recess 31*d* reduces the sectional area of the path of heat transferred from the joint between sealing material 30 and battery can 20 to the radial inside of sealing material 30. Therefore, in sealing material 30, heat is less likely to be transferred to the region radially inside relative to fourth recess 31*d*.

Modified Example 6 of Second Exemplary Embodiment

Modified example 6 of the second exemplary embodiment will be described. The present modified example is different from modified example 2 of the second exemplary embodiment described above in the shape of first ring 31. Hereinafter, differences from modified example 2 of the second exemplary embodiment will be mainly described.

Figure 12:
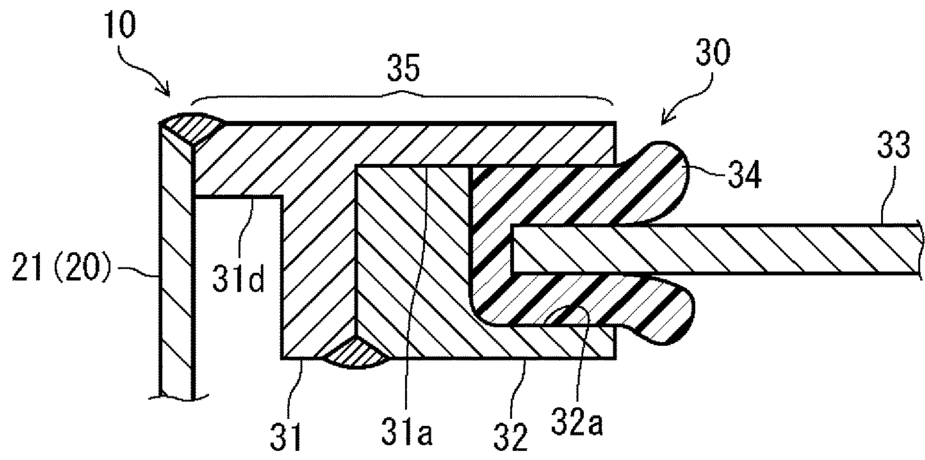
FIG. 12 is an enlarged end face view illustrating a main part of a battery of modified example 6 of the second exemplary embodiment.

As illustrated in FIG. 12, first ring 31 of the present modified example has a shape with first ring 31 of modified example 2 of the second exemplary embodiment described above removed (cut out) at a part close to the lower outer periphery. In other words, first ring 31 of the present modified example has fourth recess 31*d* in a region close to the lower end of the outer peripheral surface (region on electrode assembly 40 side of outer peripheral surface, the region axially separated from joint between sealing material 30 and battery can 20). This makes sealing material 30 of the present modified example lighter in weight than sealing material 30 of modified example 2 of the second exemplary embodiment described above. Fourth recess 31*d* reduces the sectional area of the path of heat transferred from the joint between sealing material 30 and battery can 20 to the radial inside of sealing material 30. Therefore, in sealing material 30, heat is less likely to be transferred to the region radially inside relative to fourth recess 31*d*.

Modified Example 7 of Second Exemplary Embodiment

Modified example 7 of the second exemplary embodiment will be described. The present modified example is different from modified example 3 of the second exemplary embodiment described above in the shape of second ring 32. Hereinafter, differences from modified example 3 of the second exemplary embodiment will be mainly described.

Figure 13:
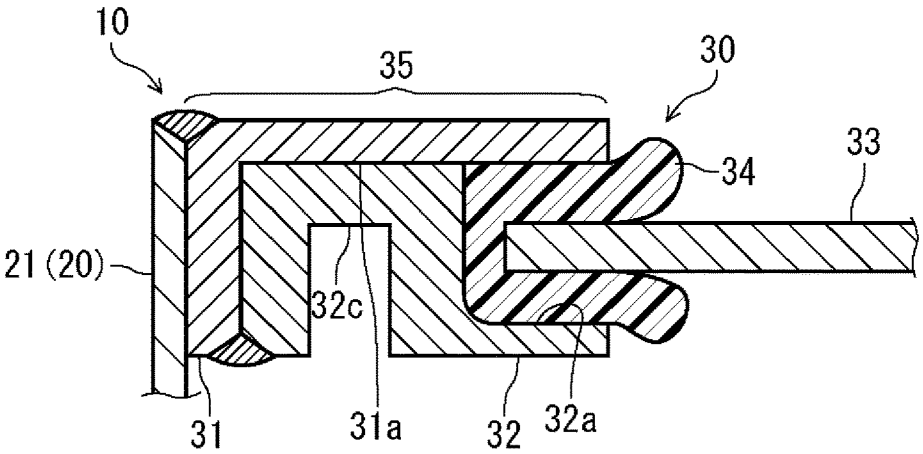
FIG. 13 is an enlarged end face view illustrating a main part of a battery of modified example 7 of the second exemplary embodiment.

As illustrated in FIG. 13, second ring 32 of the present modified example has an annular groove shape where second ring 32 of modified example 3 of the second exemplary embodiment described above is hollowed from below. In other words, second ring 32 of the present modified example has fifth recess 32*c* that is radially separated from the joint between first ring 31 and second ring 32 and opens toward the inside of battery can 20. This makes sealing material 30 of the present modified example lighter in weight than sealing material 30 of modified example 3 of the second exemplary embodiment described above. Fifth recess 32*c* reduces the sectional area of the path of heat transferred from the joint between first ring 31 and second ring 32 to the radial inside of sealing material 30. Therefore, in sealing material 30, heat is less likely to be transferred to the region radially inside relative to fifth recess 32*c*.

Modified Example 8 of Second Exemplary Embodiment

Modified example 8 of the second exemplary embodiment will be described. The present modified example is different from modified example 3 of the second exemplary embodiment described above in the shape of second ring 32. Hereinafter, differences from modified example 3 of the second exemplary embodiment will be mainly described.

Figure 14:
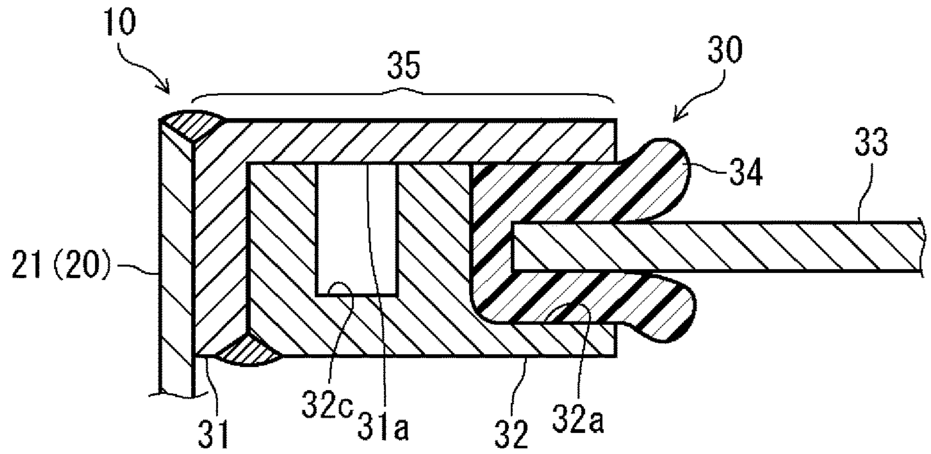
FIG. 14 is an enlarged end face view illustrating a main part of a battery of modified example 8 of the second exemplary embodiment.

As illustrated in FIG. 14, second ring 32 of the present modified example has an annular groove shape where second ring 32 of modified example 3 of the second exemplary embodiment described above is hollowed from above. In other words, second ring 32 of the present modified example has fifth recess 32*c* that is radially separated from the joint between first ring 31 and second ring 32, opens toward the outside of battery can 20, and is closed by first ring 31. This makes sealing material 30 of the present modified example lighter in weight than sealing material 30 of modified example 3 of the second exemplary embodiment described above. Fifth recess 32*c* reduces the sectional area of the path of heat transferred from the joint between first ring 31 and second ring 32 to the radial inside of sealing material 30. Therefore, in sealing material 30, heat is less likely to be transferred to the region radially inside relative to fifth recess 32*c*.

Third Exemplary Embodiment

The third exemplary embodiment will be described. The present exemplary embodiment is different from the first exemplary embodiment described above in that exposed surface 35 is formed only by first ring 31. Hereinafter, differences from the first exemplary embodiment will be mainly described.

Figure 15:
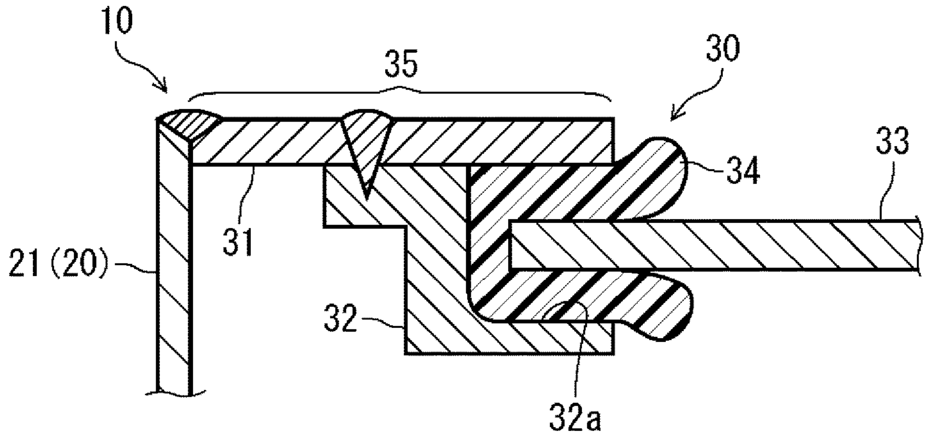
FIG. 15 is an enlarged end face view illustrating a main part of a battery of a third exemplary embodiment.

As illustrated in FIG. 15, first ring 31 is an annular member having a flat upper surface and a flat lower surface. First ring 31 has the upper surface that is exposed surface 35. Second ring 32 includes third recess 32*a* accommodating at least a part of insulation ring 34 and terminal plate 33.

First ring 31 and second ring 32 are joined to each other by piercing welding using laser L, for example. In the present exemplary embodiment, first ring 31 and second ring 32 are joined by piercing welding from first ring 31 side (upper side). This configuration can simplify the shape of first ring 31. It is also possible to simplify the shape of second ring 32.

Modified Example 1 of Third Exemplary Embodiment

Modified example 1 of the third exemplary embodiment will be described. The present modified example is different from the third exemplary embodiment described above in the aspect of joining first ring 31 and second ring 32. Hereinafter, differences from the third exemplary embodiment will be mainly described.

Figure 16:
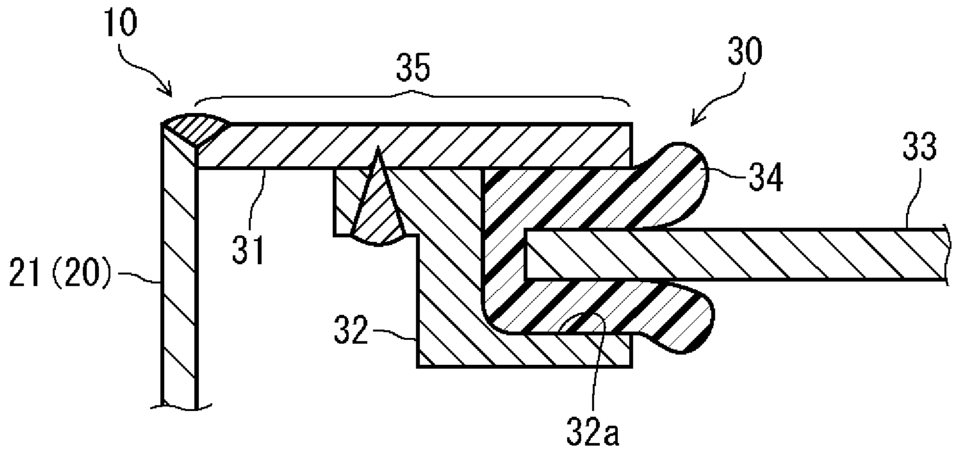
FIG. 16 is an enlarged end face view illustrating a main part of a battery of modified example 1 of the third exemplary embodiment.

As illustrated in FIG. 16, in the present exemplary embodiment, first ring 31 and second ring 32 are joined by piercing welding from second ring 32 side (lower side or electrode assembly 40 side).

Modified Example 2 of Third Exemplary Embodiment

Modified example 2 of the third exemplary embodiment will be described. The present modified example is different from the third exemplary embodiment described above in that first ring 31 and second ring 32 have a positioning structure. Hereinafter, differences from the third exemplary embodiment will be mainly described.

Figure 17:
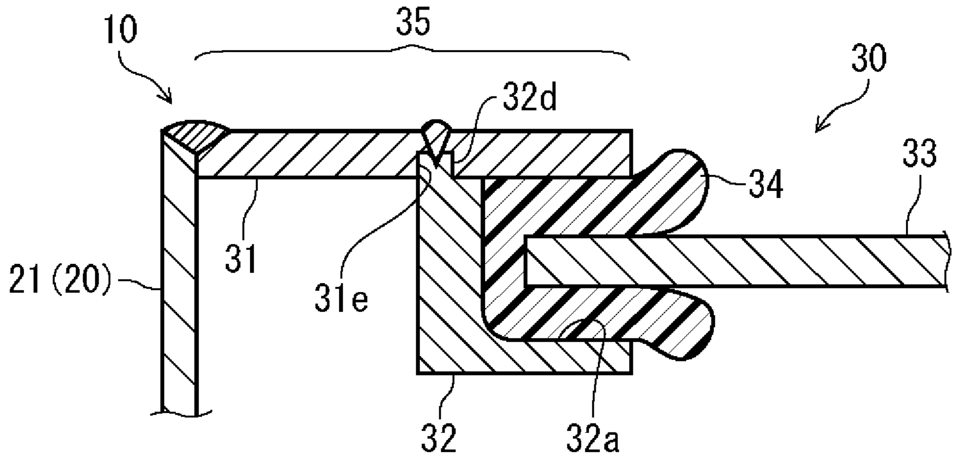
FIG. 17 is an enlarged end face view illustrating a main part of a battery of modified example 2 of the third exemplary embodiment.

As illustrated in FIG. 17, first ring 31 includes positioning recess 31*e* provided on the lower surface. On the other hand, second ring 32 includes positioning protrusion 32*d* protruding upward and fitted into positioning recess 31*e*. Therefore, when producing battery 10 of the present modified example, it is possible to easily position first ring 31 and second ring 32 to each other in the second step and the third step. First ring 31 and second ring 32 are joined to each other in a region provided with positioning recess 31*e* and positioning protrusion 32*d*. This configuration makes it easy to align first ring 31 and second ring 32.

Modified Example 3 of Third Exemplary Embodiment

Modified example 3 of the third exemplary embodiment will be described. The present modified example is different from the third exemplary embodiment described above in that first ring 31 and second ring 32 have a positioning structure. Hereinafter, differences from the third exemplary embodiment will be mainly described.

Figure 18:
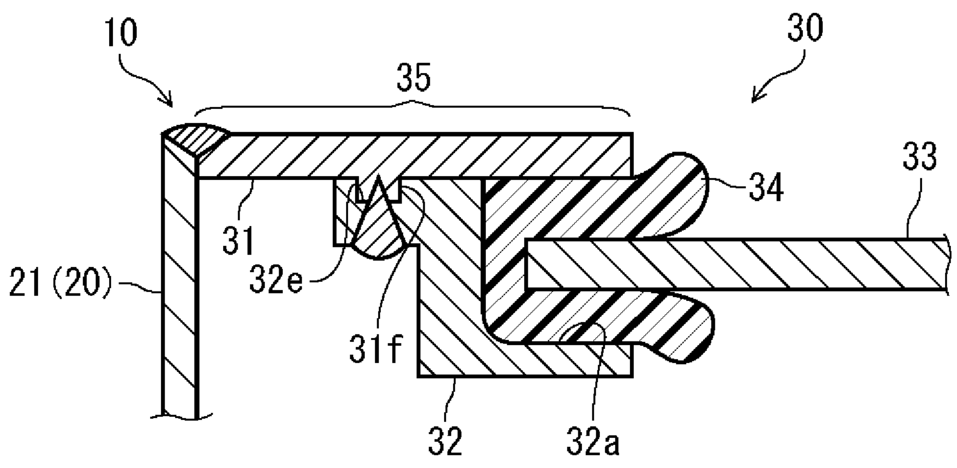
FIG. 18 is an enlarged end face view illustrating a main part of a battery of modified example 3 of the third exemplary embodiment.

As illustrated in FIG. 18, second ring 32 includes positioning recess 32*e* having an annular shape formed on the upper surface. On the other hand, first ring 31 includes positioning protrusion 31*f* having an annular shape protruding downward and fitted into positioning recess 32*e*. Therefore, when producing battery 10 of the present modified example, it is possible to easily position first ring 31 and second ring 32 to each other in the second step and the third step. First ring 31 and second ring 32 are joined to each other in a region provided with positioning recess 32*e* and positioning protrusion 31*f*. Similarly to modified example 2 of the third exemplary embodiment described above, this configuration also makes it easy to align first ring 31 and second ring 32.

Modified Example 4 of Third Exemplary Embodiment

Modified example 4 of the third exemplary embodiment will be described. The present modified example is different from the third exemplary embodiment described above in that first ring 31 has a positioning structure. Hereinafter, differences from the third exemplary embodiment will be mainly described.

Figure 19:
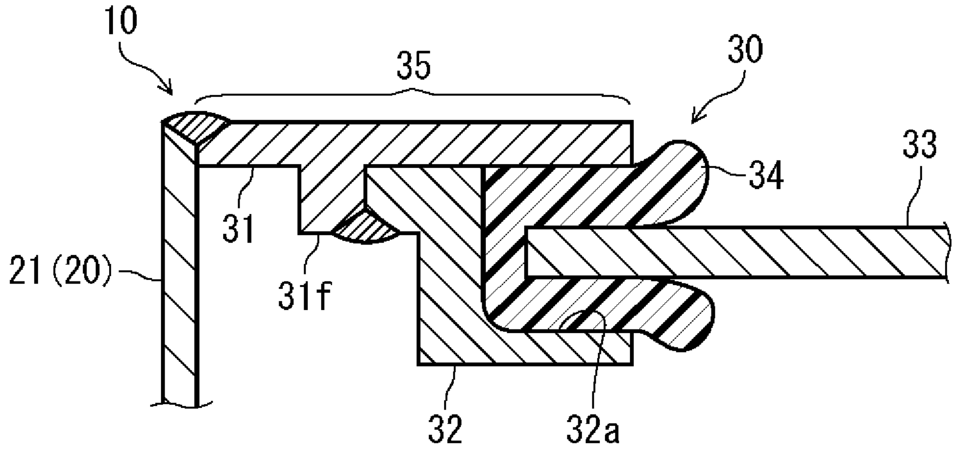
FIG. 19 is an enlarged end face view illustrating a main part of a battery of modified example 4 of the third exemplary embodiment.

As illustrated in FIG. 19, the lower surface of first ring 31 is provided with positioning protrusion 31*f* protruding downward. Positioning protrusion 31*f* has an inner diameter substantially equal to or slightly smaller than the outer diameter (second outer diameter D2) of second ring 32. Inside of positioning protrusion 31*f* having the annular shape is fitted with second ring 32. Therefore, when producing battery 10 of the present modified example, it is possible to easily position first ring 31 and second ring 32 to each other in the second step and the third step. The inner peripheral edge of positioning protrusion 31*f* of first ring 31 and the outer peripheral edge of second ring 32 are joined to each other.

It goes without saying that each sealing material 30 described in the first to third exemplary embodiments (including modified examples) may be joined to one end of battery can 20 in a state where the upper and lower surfaces are inverted from the described configuration unless the flatness of exposed surface 35 is considered.

INDUSTRIAL APPLICABILITY

The present disclosure can be used for an electricity storage device and a method for producing the electricity storage device.

REFERENCE MARKS IN THE DRAWINGS

10: battery (electricity storage device)
20: battery can
21: tubular part
22: bottom
30: sealing material
31: first ring
31*a*: first recess
31*b*: second recess
31*c*: protrusion
31*d*: fourth recess
31*e*: positioning recess
31*f*: positioning protrusion
32: second ring
32*a*: third recess
32*b*: protrusion
32*c*: fifth recess
32*d*: positioning protrusion
32*e*: positioning recess
33: terminal plate
34: insulation ring
35: exposed surface
40: electrode assembly
50: internal lead wire
D: inner diameter of exposed surface
D1: first outer diameter
D2: second outer diameter
D3: third outer diameter
L: laser

The invention claimed is:

1. An electricity storage device comprising:
- an electrode assembly including a first electrode and a second electrode;
- a can accommodating the electrode assembly and including a bottomed tubular shape with an opening provided at one end of the can; and
- a sealing material joined to the one end of the can to seal the opening, wherein
- the sealing material includes
  - a first ring that is conductive,
  - a second ring that is conductive and joined to the first ring,
  - a terminal plate that is conductive provided between the first ring and the second ring, and
  - an insulation ring insulating the first ring and the second ring from the terminal plate,
- the terminal plate includes an outer peripheral edge held between the first ring and the second ring with the insulation ring being put between the outer peripheral edge and the first ring and the second ring,
- the first ring includes a first outer diameter D1,
- the second ring includes a second outer diameter D2 smaller than the first outer diameter D1,
- the terminal plate includes a third outer diameter D3 smaller than the second outer diameter D2, and
- the one end of the can is joined with the first ring.

2. The electricity storage device according to claim 1, wherein the sealing material is formed by the first ring or by the first ring and the second ring, and includes an exposed surface disposed radially inward of the can from the one end of the can.

3. The electricity storage device according to claim 1, wherein the first ring includes a first recess fitted with the second ring.

4. The electricity storage device according to claim 3, wherein an outer peripheral edge of the second ring and an inner peripheral edge of the first recess are joined by welding.

5. The electricity storage device according to claim 4, wherein a surface of the second ring opposing the first ring is provided with a second recess accommodating at least a part of the insulation ring, and a connection between an inner bottom surface and an inner side surface of the second recess is a curved surface or an inclined surface.

6. The electricity storage device according to claim 2, wherein a side circumferential surface of at least one of the first ring and the second ring is provided with a recess or a cutout at a position spaced apart along an axis of the can from at least one of a joint between the sealing material and the one end of the can and a joint between the first ring and the second ring.

7. The electricity storage device according to claim 2, wherein an upper surface or a lower surface of at least one of the first ring and the second ring is provided with a recess or a cutout at a position spaced apart in a radial direction of the can from at least one of a joint between the sealing material and the one end of the can and a joint between the first ring and the second ring.

8. The electricity storage device according to claim 2, wherein at least one of the first ring and the second ring includes a protrusion protruding toward the insulation ring along an axis of the can.

9. An electricity storage device comprising:

an electrode assembly including a first electrode and a second electrode;

a can accommodating the electrode assembly and including a bottomed tubular shape with an opening provided at one end of the can; and sealing material joined to the one end of the can to seal the opening, wherein the sealing material includes a first ring that is conductive, a second ring that is conductive and joined to the first ring, a terminal plate that is conductive provided between the first ring and the second ring, and an insulation ring insulating the first ring and the second ring from the terminal plate, the terminal plate includes an outer peripheral edge held between the first ring and the second ring with the insulation ring being put between the outer peripheral edge and the first ring and the second ring, and each of the first ring and the second ring includes a protrusion.

10. The electricity storage device according to claim 9, wherein the protrusion of the first ring and the protrusion of the second ring are arranged side by side along the axis.

11. A method for producing the electricity storage device according to claim 1, the method comprising:

a first step of placing the insulation ring and the terminal plate on one of the first ring and the second ring;

a second step of pressing the insulation ring on the other of the first ring and the second ring to hold the outer peripheral edge of the terminal plate with the insulation ring and compress the insulation ring;

a third step of forming the sealing material by joining the first ring and the second ring to each other with the insulation ring being compressed; and a fourth step of joining the sealing material to the one end of the can.

12. The method according to claim 11, wherein the fourth step is executed after the first step, the second step, and the third step.

13. The method according to claim 11, wherein in the third step, the first ring and the second ring are joined to each other with an exhaust heat member being brought into contact with at least one of the first ring and the second ring.

14. The method according to claim 13, wherein the exhaust heat member is brought into contact with at least one of the first ring and the second ring in a region close to an outer periphery relative to a joint between the first ring and the second ring.

* * * * *